(12) United States Patent
Schomacker et al.

(10) Patent No.: US 9,656,753 B2
(45) Date of Patent: May 23, 2017

(54) HOLDING DEVICE FOR PASSENGER SEATS AND PASSENGER SEATING SYSTEM WITH FLEXIBLE SEATING ARRANGEMENT FOR MEANS OF PASSENGER TRANSPORT

(71) Applicant: Airbus Operations GmbH, Hamburg (DE)

(72) Inventors: Lars Schomacker, Hagenah (DE); Frank Quatmann, Seevetal (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 255 days.

(21) Appl. No.: 14/248,645

(22) Filed: Apr. 9, 2014

(65) Prior Publication Data

US 2014/0306060 A1    Oct. 16, 2014

(30) Foreign Application Priority Data

Apr. 11, 2013   (DE) ..................... 10 2013 103 662

(51) Int. Cl.
| | |
|---|---|
| *B64D 11/00* | (2006.01) |
| *B64D 11/06* | (2006.01) |
| *B60N 2/07* | (2006.01) |

(52) U.S. Cl.
CPC ............ *B64D 11/0696* (2013.01); *B60N 2/07* (2013.01); *B64D 11/06* (2013.01); *B64D 11/0601* (2014.12); *B64D 11/0648* (2014.12)

(58) Field of Classification Search
None
See application file for complete search history.

(56) References Cited

U.S. PATENT DOCUMENTS 3,603,638 A * 9/1971 McGregor ........... B60N 2/4221
                                                          248/429
4,771,969 A * 9/1988 Dowd ................ B64D 11/0696
                                                          244/118.6
(Continued)

FOREIGN PATENT DOCUMENTS

| DE | 10337746 A1 | 3/2005 |
|---|---|---|
| DE | 102007063565 A1 | 6/2009 |

(Continued)

OTHER PUBLICATIONS

German Patent and Trade Mark Office, German Search Report for German Patent Application No. 102013103662.7, mailed Feb. 18, 2014.

(Continued)

*Primary Examiner* — Medhat Badawi
(74) *Attorney, Agent, or Firm* — Lorenz & Kopf, LLC

(57) ABSTRACT

A holding device is provided for fastening passenger seats in a means of passenger transport and a corresponding passenger seating system. The holding device comprises a seat leg fixing element, a sliding element and a rail element. The seat leg fixing element is designed to receive a seat leg of a passenger seat. The sliding element is provided on the opposite side of the holding device to the seat leg fixing element and is designed to be inserted in a seat rail located on the floor of the means of passenger transport. The rail element is provided on the same side as the seat leg fixing element and is designed to receive and fix a sliding element of an additional holding device. The holding device is provided on a front seat leg and the additional holding device is provided on a rear seat leg of a folding passenger seat.

15 Claims, 3 Drawing Sheets

(56) References Cited

U.S. PATENT DOCUMENTS

| | | | | |
|---|---|---|---|---|
| 4,796,837 A * | 1/1989 | Dowd | B64D 11/0696 | 244/122 R |
| 5,800,015 A * | 9/1998 | Tsuchiya | B60N 2/0715 | 248/430 |
| 6,086,018 A * | 7/2000 | Gobeil | B60N 2/015 | 244/122 R |
| 6,155,626 A * | 12/2000 | Chabanne | B60N 2/0155 | 248/503.1 |
| 6,196,613 B1 * | 3/2001 | Arai | B60N 2/3031 | 296/65.09 |
| 6,260,813 B1 * | 7/2001 | Whitcomb | B64D 11/0696 | 244/118.6 |
| 6,572,304 B1 * | 6/2003 | Hessling | B60R 11/00 | 244/118.5 |
| 6,863,344 B2 * | 3/2005 | Smallhorn | B64D 11/0015 | 108/44 |
| 7,163,178 B2 * | 1/2007 | Ricaud | B64C 1/18 | 244/117 R |
| 7,300,090 B2 * | 11/2007 | Rana | B60N 2/3075 | 296/65.05 |
| 7,370,831 B2 * | 5/2008 | Laib | B64C 1/18 | 174/70 B |
| 7,389,960 B2 * | 6/2008 | Mitchell | B60N 2/0224 | 244/118.5 |
| 7,410,127 B1 * | 8/2008 | Ahad | B64D 11/0696 | 244/118.5 |
| 7,712,829 B2 * | 5/2010 | Park | B60N 2/01 | 296/65.13 |
| 7,713,009 B2 * | 5/2010 | Hudson | B64D 9/003 | 410/104 |
| 7,814,637 B2 * | 10/2010 | Terada | B60N 2/0224 | 174/113 R |
| 7,900,990 B2 * | 3/2011 | Townson | B60P 7/0815 | 296/100.16 |
| 8,191,829 B2 | 6/2012 | Erickson et al. | | |
| 8,322,767 B2 * | 12/2012 | Morita | B60P 3/423 | 296/183.1 |
| 8,801,101 B2 * | 8/2014 | Dagcioglu | B60N 2/3011 | 296/65.09 |
| 9,010,712 B2 * | 4/2015 | Gray | B60N 2/0818 | 248/424 |
| 9,061,606 B2 * | 6/2015 | Mizuno | B60N 2/0232 | |
| 9,180,969 B2 * | 11/2015 | Kunze | A61G 3/06 | |
| 2002/0027383 A1 * | 3/2002 | Tsuda | B60N 2/10 | 297/340 |
| 2002/0125753 A1 * | 9/2002 | Kammerer | B60N 2/0292 | 297/331 |
| 2005/0104431 A1 * | 5/2005 | Saberan | B60N 2/206 | 297/331 |
| 2005/0116522 A1 * | 6/2005 | Holdampf | B60N 2/206 | 297/378.1 |
| 2006/0061174 A1 * | 3/2006 | Saberan | B60N 2/12 | 297/331 |
| 2007/0063565 A1 * | 3/2007 | Habedank | B60N 2/123 | 297/341 |
| 2007/0132266 A1 * | 6/2007 | Ghergheli | B60N 2/0292 | 296/65.09 |
| 2007/0246985 A1 * | 10/2007 | Sahi | B60N 2/12 | 297/331 |
| 2008/0111391 A1 * | 5/2008 | Imamura | B60N 2/20 | 296/65.01 |
| 2008/0164740 A1 * | 7/2008 | Harper | B60N 2/045 | 297/331 |
| 2008/0224520 A1 * | 9/2008 | Veluswamy | B60N 2/01583 | 297/335 |
| 2010/0052391 A1 * | 3/2010 | Hurst, III | B60N 2/3031 | 297/341 |
| 2010/0067999 A1 * | 3/2010 | Poupon | B60N 2/07 | 410/105 |
| 2010/0071488 A1 * | 3/2010 | Steinbeck | B64D 11/0696 | 74/89.21 |
| 2010/0074680 A1 * | 3/2010 | Vine | B64D 11/0696 | 403/300 |
| 2010/0116933 A1 * | 5/2010 | Erickson | B64C 1/20 | 244/118.5 |
| 2010/0308619 A1 * | 12/2010 | Hoge | B60N 2/12 | 296/65.08 |
| 2011/0017869 A1 * | 1/2011 | Gonnsen | B64D 11/00 | 244/118.6 |
| 2011/0309195 A1 * | 12/2011 | Bishop | B64D 11/0696 | 244/118.6 |
| 2012/0072079 A1 * | 3/2012 | Schliwa | B64D 11/06 | 701/49 |
| 2012/0292969 A1 * | 11/2012 | Murray | B60N 2/3011 | 297/344.1 |
| 2012/0292986 A1 * | 11/2012 | Riedel | B60Q 3/0259 | 307/9.1 |
| 2013/0147248 A1 * | 6/2013 | Wolf | B60N 2/12 | 297/325 |
| 2013/0193732 A1 * | 8/2013 | Brand | B60N 2/14 | 297/344.21 |
| 2014/0077577 A1 * | 3/2014 | Gensch | B60N 2/01575 | 297/463.1 |
| 2014/0306061 A1 * | 10/2014 | Schomacker | B64D 11/0648 | 244/118.6 |
| 2015/0375637 A1 * | 12/2015 | Kikuchi | B60N 2/12 | 297/317 |

FOREIGN PATENT DOCUMENTS

| | | |
|---|---|---|
| DE | 102009004988 B3 | 8/2010 |
| DE | 102010004798 A1 | 7/2011 |
| WO | 20120152937 A2 | 11/2012 |

OTHER PUBLICATIONS

European Patent Office, European Search Report for European Patent Application No. 14163349.5 mailed Nov. 19, 2014.

* cited by examiner

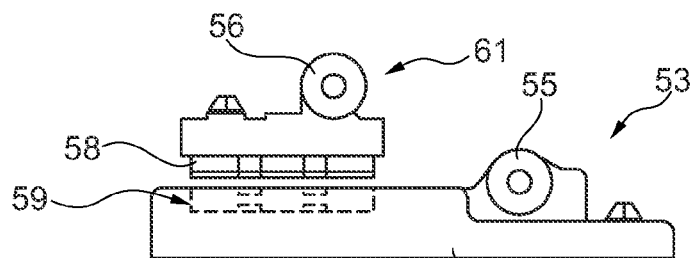
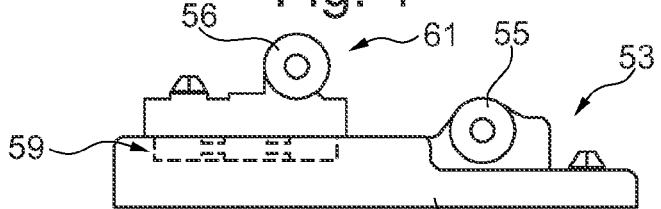
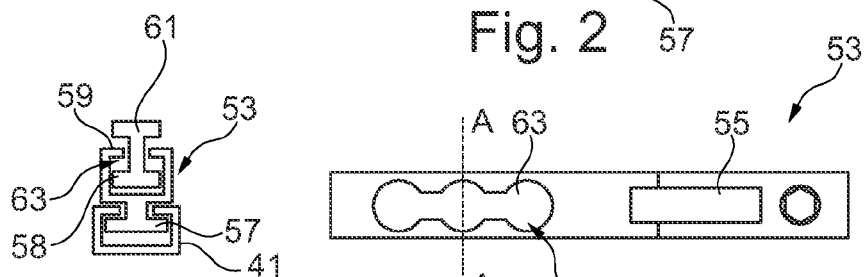
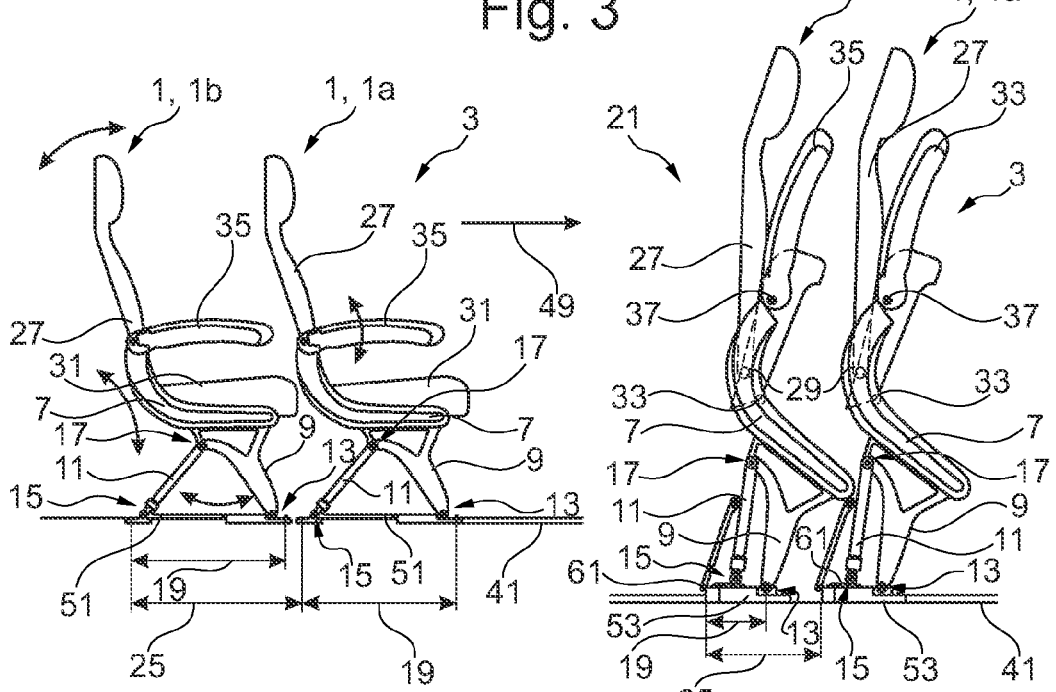

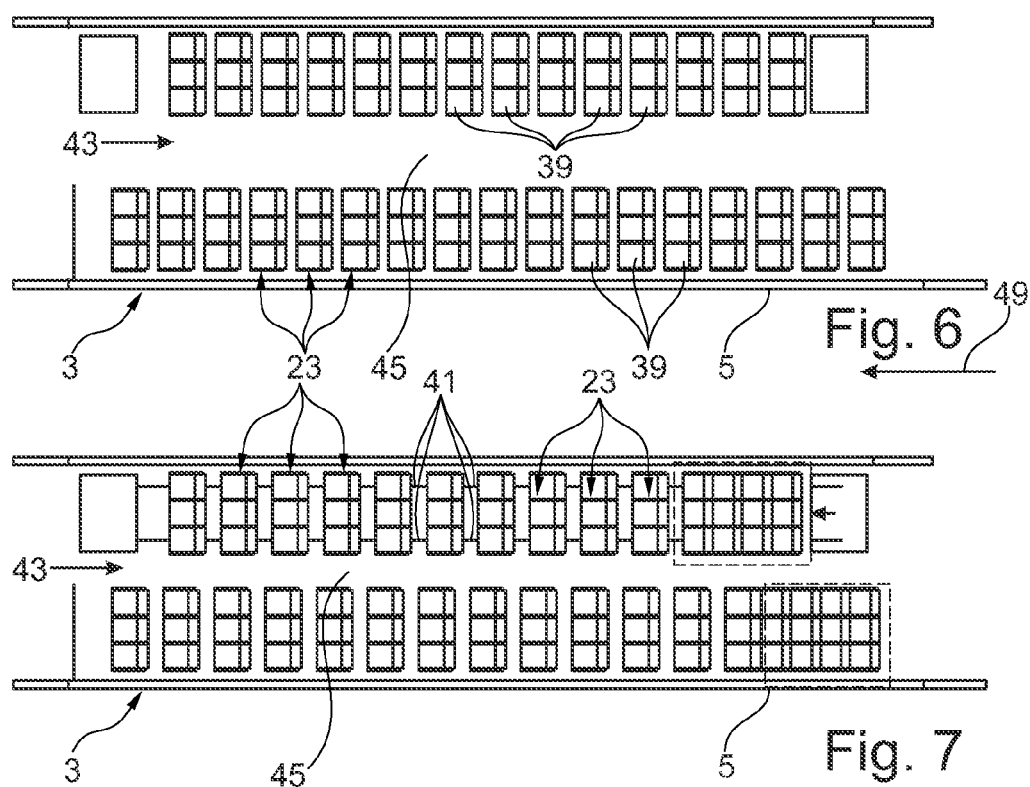
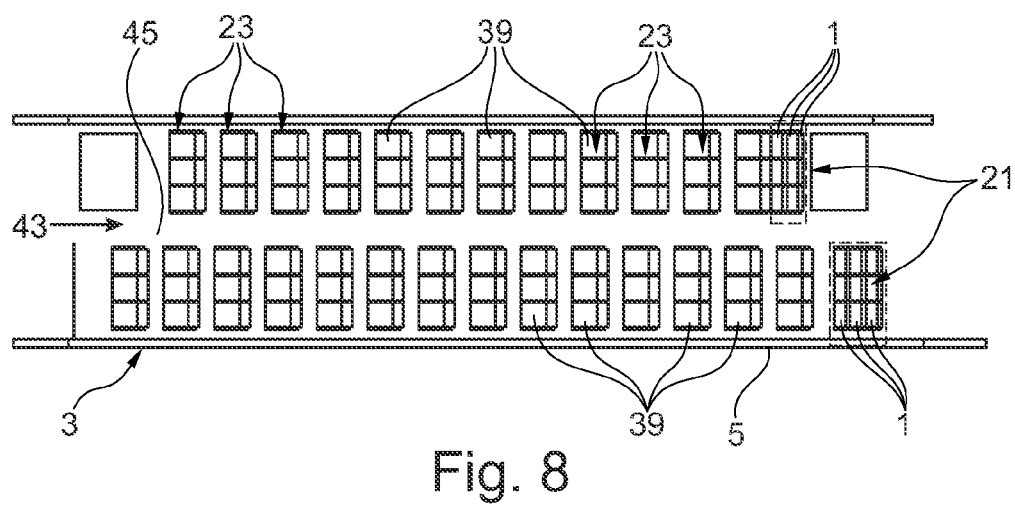

HOLDING DEVICE FOR PASSENGER SEATS AND PASSENGER SEATING SYSTEM WITH FLEXIBLE SEATING ARRANGEMENT FOR MEANS OF PASSENGER TRANSPORT

CROSS-REFERENCE TO RELATED APPLICATION

This application claims priority to German Patent Application No. 10 2013 103 662.7 filed Apr. 11, 2013, which is incorporated herein by reference in its entirety.

TECHNICAL FIELD

The technical field relates to a holding device for fastening passenger seats in a means of passenger transport, a corresponding passenger seating system for means of passenger transport, an aircraft with a passenger seating system and a corresponding method for transforming a folding passenger seat in the passenger seating system from a usable state to a stored state.

BACKGROUND

The number and distribution of seats in the cabin of a means of passenger transport, for example an aircraft, may represent an important economic factor. Known seats for means of transport are generally inflexible and have a fixed spacing between the seat legs. In addition, the seat legs may be connected to the floor of the means of transport via holders with a rail system. Corresponding holders and rail systems are known in the art from DE 10 2011 075 771 A1, WO 2012 152 937 A2, DE 10 2008 048 744 A1 and US 2010 071 488 A1 for example.

Reconfiguration of seats which are already installed may require considerable time and effort. It may be difficult, especially in aircraft, to adapt the distribution of seats in the cabin to the number and category of places actually reserved.

In addition, other objects, desirable features and characteristics will become apparent from the subsequent summary and detailed description, and the appended claims, taken in conjunction with the accompanying drawings and this background.

SUMMARY

Accordingly, there may be a need to provide an option to increase the flexibility of the seating arrangement in a means of passenger transport with minimal outlay in terms of time and cost.

According to one of various aspects of the present disclosure, a holding device is provided for fastening passenger seats in a means of passenger transport. The holding device comprises a seat leg fixing element, a sliding element and a rail element. The seat leg fixing element is designed to receive a seat leg of a passenger seat. The sliding element is provided on the opposite side of the holding device to the seat leg fixing element and is designed to be inserted in a seat rail arranged on the means of passenger transport. The rail element is provided on the same side as the seat leg fixing element and is designed to receive and fix a sliding element of a further holding device.

In other words, the notion behind the present disclosure is based on providing a holding device with a rail element on a side facing away from the seat rail or from the floor of the means of passenger transport. In this process the rail element may be similar to or identical to a portion of the seat rail provided on the floor of the means of passenger transport in terms of its geometric configuration and its dimensions. In this case the rail element is designed to receive a sliding element of a similar or identical holding device. For example, the holding device may be provided on a front seat leg and the additional holding device may be provided on a rear seat leg of a folding passenger seat so that when the seat is folded, the rear seat leg can be swiveled towards the front seat leg and the holding device for the rear seat leg can be fixed in or on the holding device for the front seat leg.

The rail element on the holding device according to the present disclosure makes it possible to position the seat legs as closely as possible to one another and to fix them as closely as possible next to each other. In other words, when the passenger seat is in the stored state, a first fastening element of the front seat leg may, for example, be fixed in the seat leg fixing element and a second fastening element of the rear seat leg may be fastened in the rail element directly adjacent to or behind the seat leg fixing element in the direction of the seating. In this case the seat rail can be provided on the floor, on the side or on the roof of the means of passenger transport.

When the folding passenger seat is in the usable state, the rear seat leg can be connected to the seat rail via the additional holding device. In the stored state, the additional holding device is located on the holding device for the front seat leg, which is in turn located on the seat rail. Thus in the stored state, the additional holding device with the rear seat leg is in a higher position than in the used state. This permits a more upright position and thus reduces the space taken up by the passenger seat in the stored state.

The holding device thus permits greater flexibility of the passenger seating arrangement in the cabin of the means of passenger transport. For example, the flexibility of the seating arrangement can be increased with reference to the seat spacing. Unused folding passenger seats can be stowed in a smaller space in this process thanks to the holding device. Furthermore, the simple design of the holding device permits rapid and efficient reconfiguration of the seating arrangements or the spacing between the passenger seats.

The holding device, also referred to as a fitting, is designed for use in means of passenger transport with several rows of passenger seats, for example. In this case means of passenger transport may include, for example, trains, buses or airborne vehicles, for example, aircraft.

The seat leg fixing element is designed to receive and fix a seat leg and in one example, a fastening element for a seat leg. For example, the seat leg fixing element may be designed as a loop which is designed to be consistent with a loop of a fastening element on the seat leg. If the two loops are brought together, a fixing pin, and in one example, a bolt, can be passed through the loops and fixed with a corresponding nut. Alternatively the seat leg fixing element and the fastening element for the seat leg may be designed as corresponding latching or snap-in connections. In addition, the seat leg fixing element may be suitable for quick installation and for toolless and standard fitting. In this case the seat leg fixing element is located on the opposite side of the holding device to the sliding element. In one example, the seat leg fixing element is located on the side of the holding device facing away from the seat rail or from the floor of the means of passenger transport.

The sliding element is located on the side of the holding device facing the floor of the means of passenger transport and is designed to engage with the seat rail and be moved in or on the seat rail. The sliding element may also be referred to as a displacement element. Furthermore, the sliding element may slide, slip or roll on the rail. In this case the sliding element may also comprise a latching function so that the holding device can be fixed to the seat rail at pre-defined intervals by means of the sliding element.

In this process the seat rail may, for example, be designed with an undercut rail profile. The seat rail may in one example comprise a substantially T-shaped profile with a flange. In this case the sliding element may comprise arms which wrap around the flange of the seat rail and may, for example, be designed in the form of a comb. In this operation the sliding element can slide on the flange of the seat rail. Alternatively the seat rail may comprise a substantially C-shaped profile, so that the sliding element is inserted in the seat rail and slides along an inner surface of the seat rail.

The rail element may be designed to be identical to or similar to a portion of the seat rail, such that a sliding element of a further connecting element can be inserted without any problem either in the seat rail or on/in the rail element as preferred. In one example, the rail element may comprise a substantially T-shaped or substantially C-shaped profile. In this case the rail element is also oriented parallel to the seat rail when the sliding element is inserted in the rail.

The holding device may, for example, be positioned on the front or on the rear seat leg of a folding passenger seat. The additional holding device may be positioned accordingly on the other seat leg. If the holding device is provided on the front seat leg, the additional holding device may be positioned on the rear seat leg. However, if the holding device is positioned on the rear seat leg, the additional holding device may be provided on the front seat leg.

The additional holding device may be identical to or similar to the holding device. In other words, holding devices according to the present disclosure may be provided on both the front and rear seat leg. Alternatively, the additional holding device may be designed as a conventional holding device with a seat leg fixing element and a sliding element, for example, but without a rail element.

According to one embodiment of the present disclosure, the rail element is designed to be identical to the seat rail of the means of passenger transport. In other words, the rail element corresponds to at least one portion of the seat rail in terms of geometric shape and dimensions. This thus means that no changes need to be made to the sliding element of the additional holding device. For example, conventional sliding elements which are used with the seat rail, for example, can also be used with the rail element.

According to one embodiment of the present disclosure, the rail element comprises an undercut profile. In other words the rail element is designed to be similar to the seat rail with a substantially T-shaped or substantially C-shaped profile, which engages with the sliding element of the additional holding device.

According to one embodiment of the present disclosure, the rail element comprises outer or inner latching portions which engage with the sliding element of the additional holding device. In other words, the rail element comprises indentations and, for example, substantially straight regions or regions running substantially parallel to the seat rail. The indentations may, for example, be substantially semi-circular in shape and correspond to the regions at which the sliding element of the additional holding device can be engaged with the rail element or threaded into the rail element. In this case the sliding element comprises corresponding latching portions if necessary which must lie directly over or on the corresponding latching portions of the rail element for insertion into the rail element. If the sliding element is displaced along the rail element, said sliding element can only be released from the rail element again when the respective latching portions lie above one other once again.

According to one of various aspects of the present disclosure, a passenger seating system is provided with a flexible seating arrangement for a means of passenger transport. The passenger seating system comprises a holding device as described above, a seat rail and a folding passenger seat. The seat rail is, for example, positioned on the floor of the cabin, on the cabin roof or on a side wall of the means of passenger transport. The folding passenger seat comprises a front seat leg and a rear seat leg. A first fastening element is provided on the front seat leg and a second fastening element is provided on the rear seat leg. One of the fastening elements is fixed in a seat leg fixing element of the holding device in this process. A sliding element of the holding device engages with the seat rail. The other fastening element is also fixed in a seat leg fixing element of an additional holding device. In this case, a rail element of the holding device is designed to receive and fix a sliding element of the additional holding device.

In one example, the passenger seating system comprises a plurality of folding passenger seats and also a plurality of rows of seats comprising folding passenger seats. The passenger seating system may also comprise a plurality of seat rails and a number of holding devices. For example, four holding devices may be provided for each folding passenger seat or for each row of passenger seats.

By providing the holding device according to the present disclosure in the passenger seating system, the space taken up by folding passenger seats in the stored state can be minimised to a particularly optimum degree. Furthermore, transforming the folding passenger seat from the usable state to the stored state can be a very simple procedure, requiring only minimal effort, thanks to the simple design of the holding device and the folding passenger seats.

In the case of aircraft, for example, the seating arrangements can be adjusted to the number of seats actually booked and adapted to the corresponding seating categories in a short space of time. For example, the adjustments can be made between the passengers leaving the cabin and the new passengers boarding. If, for example, a number of rows are not booked, or in other words are free, on the current flight, the unused seating rows can be transformed to the stored state before the passengers board and the seat spacing between the booked rows can be increased so that passengers can travel in greater comfort.

In this case the passenger seat can be designed as part of a row of seats. The row of seats may, for example, comprise two or three passenger seats. The passenger seats in a row of seats may in one example, comprise shared front and/or rear seat legs. The first fastening element is provided in a lower region of the front seat leg. The second fastening element is also provided in the lower region of the rear seat leg.

According to one embodiment of the present disclosure, the folding passenger seat comprises a seat frame. In this case a first joint element is arranged between the front seat leg and the seat frame and/or between the rear seat leg and the seat frame such that the spacing between the first fastening element and the second fastening element is variable. In other words the first joint element allows the seat legs to be swiveled against one another so that the sliding element of the additional holding device can be positioned in the rail element of the holding device.

A seat shell, also referred to as a seat pan, may be provided on an upper side of the seat frame. The front seat leg and the rear set leg may be provided on the underside of the seat frame. In this process the front seat leg may be arranged in a front region of the seat frame in the direction of travel of the means of passenger transport or in the passenger seating direction. The rear seat leg may accordingly be arranged in a rear region of the seat frame.

The first joint element, which is arranged between the front seat leg and the seat frame, may be designed as a movable connector between the two components. The first joint element may in one example be designed as a swivel joint or as a hinge. In this case the first joint element acts as a point of rotation or axis of rotation for swiveling the front seat leg. Alternatively the first joint element may be arranged between the rear seat leg and the seat frame. In addition a first joint element may be arranged between the seat legs and the seat frame in each case.

A first joint element may in one example be arranged between the first fastening element and the second fastening element on one of the seat legs. In this case the first joint element may be arranged directly between the seat frame and one of the seat legs. Alternatively the first joint element may be arranged indirectly between one of the seat legs and the seat frame. In other words the first joint element may be arranged between the first and second seat legs, for example.

In this case the first joint element is arranged between the seat legs and the seat frame such that the spacing between the first fastening element and the second fastening element is variable. In other words the seat legs can be swiveled around the first joint such that the spacing between the first fastening element and the second fastening element is either increased or reduced. This spacing may, for example, be measured parallel to the cabin floor between the geometric mid-points of the fastening elements.

A maximum spacing between the fastening elements and thus the holding devices fixed to the fastening elements may, for example, be approximately 18" or about 19". This corresponds to about 45.72 or about 48.26 cm. In this case the front and rear seat legs are folded out to the maximum extent so that the minimum seat spacing when storing the passenger seats is approximately 21" or about 53.34 cm, for example. Folding up the seat legs via the first joint element, for example, makes it possible to obtain a minimum spacing between the holding devices or the fastening elements of between about 12" and about 14" or between about 30.48 cm and about 35.65 cm if the holding devices are not released from the seat rails on the cabin floor. In this case, the minimum seat spacing can be reduced to approximately 15" or about 16" or about 38.10 cm or about 40.64 cm. If one of the holding devices is released from the seat rails on the cabin floor, the spacing between the fastening elements can even be reduced to zero. In this case, a minimum seat spacing of approximately 10" or about 11" or about 25.40 cm or about 27.94 cm can be achieved.

According to one embodiment of the present disclosure, the folding passenger seat is designed to adopt a usable state in which the holding device and the additional holding device are positioned in the seat rail. Furthermore, the folding passenger seat is designed to adopt a stored state in which the sliding element of the additional holding device is positioned in the rail element of the holding device.

The spacing between the first fastening element and the second fastening element is smaller in the stored state than in the usable state. In the usable state, the spacing between the fastening elements may, for example, be about 18" or about 19". In the stored state, the spacing between the fastening elements may be between about 0" and about 10".

According to one embodiment of the present disclosure, the passenger seating system is also designed such that the passenger seat adopts a seat spacing of a maximum of about 11 inches from an adjacent front seat and/or an adjacent rear seat in the stored state.

According to one embodiment of the present disclosure, the first fastening element is fixed in the seat leg fixing element of the holding device. The second fastening element is also fixed in the seat leg fixing element of the additional holding device. In other words, the rear seat leg is swiveled towards the front seat leg via the first joint element and then fixed to or on the holding device of the front seat leg by means of the sliding element of the additional holding device. In this operation, the rear seat leg is raised since the additional holding device of the rear seat leg is located on the holding device of the front seat leg and is thus further away from the seat rail. The folding seat can thus be folded up in a more upright and compact manner in the folded state so that it takes up less space.

According to one embodiment of the present disclosure, the passenger seat also comprises a backrest. In this case the backrest is connected to the seat frame via a second joint element such that the backrest is positioned above the first fastening element and/or above the second fastening element in the stored state. In other words, the backrest may, for example, be swiveled backwards with respect to the direction of travel of the means of passenger transport or with respect to the seating direction such that a geometric midpoint of the backrest is positioned vertically above the fastening elements when the passenger seat is in the stored state. In one example, the backrest may run substantially along a mid-perpendicular line between the fastening elements. In this case, for example, substantially may mean a maximum deviation of about 20 cm, especially of about 10 cm and in one example of about 5 cm from the vertical above one of the fastening elements.

The second joint element may be designed as a hinged point of rotation or as a hinged axis of rotation, similar to the first joint element. For example, the second joint element may make it possible to tilt the backrest backwards through an angle of between about 20° and about 40°, and for example, about 33°. The space required by the passenger seat in the stored state can thus be reduced even further.

According to one embodiment of the present disclosure, the folding passenger seat also comprises a seat cushion. The seat cushion can be arranged on the seat frame or on a seat shell provided on the seat frame in this case. In this case the seat cushion is connected to the seat frame or to the seat shell via a third joint element such that the seat cushion is positioned above the first fastening element and/or above the second fastening element in the stored state. In other words, the seat cushion can adopt a more or less vertical position along a mid-perpendicular line between the fastening elements and thus reduce the space required by the passenger seat in the stored state.

According to one embodiment of the present disclosure, the seat cushion is fixed to the seat frame or to the seat shell in a removable manner. By removing the seat cushion, the space required by the passenger seat in the stored state can be reduced.

According to one embodiment of the present disclosure, the folding passenger seat also comprises an armrest. The armrest is arranged on the backrest. In this case the armrest is connected to the backrest via a fourth joint element such that the armrest is positioned above the first fastening element and/or above the second fastening element in the stored state. Alternatively the armrest can be connected to the seat frame via the fourth joint element. Like the backrest and the seat cushion, the armrest can be swiveled around the fourth joint element in the stored state such that the geometric mid-point of the armrest is positioned in a region of a mid-perpendicular line between the first fastening element and the second fastening element.

One of various aspects of the present disclosure describes the use of a holding device as described above in an aircraft.

One of various aspects of the present disclosure describes an aircraft with a passenger cabin and a cabin floor. A rail system is provided on the cabin floor in this case. A passenger seating system as described above is also provided on the rail system.

One of various aspects of the present disclosure describes a method for transforming a folding passenger seat in the above-described passenger seating system from a usable state to a stored state. The method comprises the following steps: releasing an additional holding device, which is connected to the rear seat leg of the folding passenger seat, from a seat rail; swiveling the rear seat leg around a first joint element; and positioning and fixing a sliding element of the additional holding device in a rail element of a holding device as described above.

The method may also comprise the following steps: releasing a rail cover from the additional fastening device; raising the folding passenger seat or seat frame and rotating the folding passenger seat around the first fastening element; rotating the folding passenger seat or the backrest around the second joint element so that the backrest is arranged in a vertical position; rotating the armrest around a fourth joint element so that the armrest is also arranged in a vertical position; rotating the seat cushion around the first joint element so that this is also positioned in a vertical position; raising the rail cover and fixing the rail cover to the rear seat leg, for example. The sequence of steps may vary during this operation.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows a side view of a holding device and an additional holding device located above the first holding device.

FIG. 2 shows a side view of a holding device which has a sliding element of an additional holding device inserted in its rail element.

FIG. 3 shows a cross-section through and a top view of a holding device.

FIG. 4 shows a passenger seating system with holding devices and folding passenger seats.

FIG. 5 shows a passenger seating system with holding devices and folding passenger seats in the stored state.

FIG. 6 shows a cabin in a means of passenger transport in which all the seats are used.

FIG. 7 shows a cabin in a means of passenger transport in which some of the seats are unused and stowed as in FIG. 4.

FIG. 8 shows a cabin in a means of passenger transport in which some of the seats are unused and transformed to the stored state as in FIG. 5.

DETAILED DESCRIPTION

Figure 9:
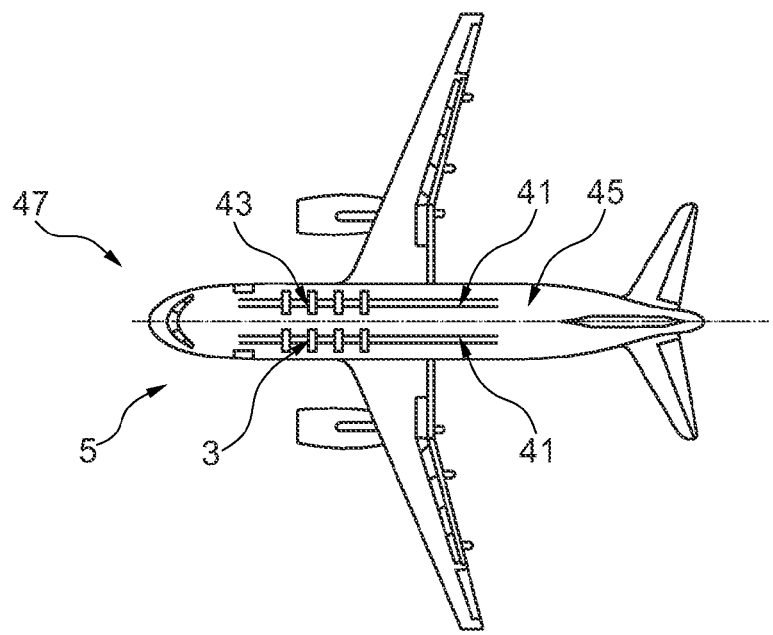
FIG. 9 shows an aircraft with a passenger seating system according to an embodiment of the present disclosure.

The following detailed description is merely exemplary in nature and is not intended to limit the present disclosure or the application and uses of the present disclosure. Furthermore, there is no intention to be bound by any theory presented in the preceding background or the following detailed description. In addition, spacings and relationships between sizes are not shown true to scale in the figures. Similar or identical components are given the same reference numerals in the various figures.

In means of passenger transport, such as for example, aircraft, it may be advantageous to adapt the number and distribution of seats to the booked seating categories and to the number of booked seats in a flexible manner. With known seats, for example, the seat surface can merely be folded away, just like a cinema seat. With known seats, the spacing between the seat legs is a fixed parameter. In this case the seat legs may be connected to rails in the cabin floor by means of holders.

FIGS. 1 to 3 illustrate holding devices 53 which make it possible to reduce or minimise the space required by a folding passenger seat 1, especially when the passenger seat 1 is in the stored state 21. During this process, the holding devices 53, along with the folding seats 1, for example, in an aircraft cabin, make it possible to respond in a quick and flexible manner to different flight scenarios, different flight destinations, different passenger numbers and different passenger classes. For example, the folding passenger seats 1 and the holding devices 53 make it possible to reconfigure the seating arrangement during a transition period, i.e. between the passengers leaving the cabin and new passengers boarding. Previously this was only possible during a technical check or during a night stopover on the ground. The folding passenger seats 1 also make it possible to ensure the availability of seating arrangements with a more comfortable seat spacing for the passengers. In this case, the unused folding passenger seats 1 do not need to be removed from the means of passenger transport, as was previously the case, but can be transformed to a stored state in the said means of passenger transport.

To this end, the holding devices 53 comprise a seat leg fixing element 55, a sliding element 57 and a rail element 59, as shown in FIG. 1. The seat leg fixing element 55 is designed to receive a seat leg 9, 11 of the folding passenger seat 1, 1a, 1b. The sliding element 57 is provided on the opposite side of the holding device 53 to the seat leg fixing element 55 and is designed to be inserted in a seat rail 41 arranged on the floor 45 of the means of passenger transport 5. The rail element 59 is provided on the same side as the seat leg fixing element 55 and is designed to receive and fix a sliding element 58 of an additional holding device 61. The rail element 59 is shown as a dashed line in FIGS. 1 and 2.

In this process the rail element 59 may be similar to or identical to a portion of the seat rail 41 provided on the floor 45 of the means of passenger transport 5 in terms of its geometric configuration and its dimensions. For example, the holding device 53 may be provided on a front seat leg 9 and the additional holding device 61 may be provided on a rear seat leg 11 of a folding passenger seat 1 so that when the seat is folded, the rear seat leg 11 can be swiveled towards the front seat leg 9 and the holding device 61 for the rear seat leg 11 can be fixed in or on the holding device 53 for the front seat leg 9. This is illustrated in FIG. 2 or FIG. 5 for example.

The rail element 59 on the holding device 53 according to the present disclosure makes it possible to position the seat legs 9, 11 as closely as possible to one another and to fix them as closely as possible next to each other. In other words, when the passenger seat 1 is in the stored state 21, a first fastening element 13 of the front seat leg 9 may, for example, be fixed in the seat leg fixing element 55 and a second fastening element 15 of the rear seat leg 11 may be fastened in the rail element 59 directly adjacent to or behind the seat leg fixing element 55 in the direction of the seating 49.

In the stored state 21, as shown in FIG. 5 by way of example, the additional holding device 61 is located on the holding device 53 for the front seat leg 9, which is in turn located on the seat rail 41. Thus, in the stored state 21, the additional holding device 61 with the rear set leg 11 is in a higher position than in the usable state. This permits a more upright position and thus reduces the space taken up by the passenger seat 1 in the stored state 21.

In the illustrated embodiments, the additional holding device 61 is designed like the holding device 1 and also comprises a sliding element 58 and a seat leg fixing element 56. However, the additional holding device 61 does not have a rail element.

FIG. 2 shows a configuration of the holding device 53 similar to FIG. 1. In this case the sliding element 58 of the additional holding device 61 is inserted in the rail element 59.

The right-hand region of FIG. 3 shows a top view of a holding device 53 as illustrated in FIGS. 1 and 2. In the top view, the undercut profile 63 of the rail element 59 is shown with latching portions. In FIG. 3 the undercut profile is designed to be substantially C-shaped. This is shown clearly in cross-section in the left-hand region of FIG. 3. In this case the left-hand region of FIG. 3 shows a cross-section along line A-A through the holding device 1. In addition to the image shown in the right-hand region of FIG. 3, the left-hand region of FIG. 3 shows the interaction of the seat rail 41, holding device 53 and additional holding device 61. The sliding element 57 of the holding device 53 engages with the seat rail 41. The sliding element 58 of the additional holding device 61 also engages in the rail element 59 of the holding device 53.

FIGS. 4 and 5 show passenger seating systems 3 with two folding passenger seats 1a, 1b in different states in each case. The folding passenger seat 1 comprises a seat frame 7, a front seat leg 9 with a first fastening element 13 and a rear seat leg 11 with a second fastening element 15 in each case. The first fastening element 13 is connected to a seat leg fixing element 55 of the holding device 53 in this case. The second fastening element is also connected to the seat leg fixing element 56 of the additional holding device 61. A first joint element 17 is provided between the rear seat leg 11 and the seat frame 7, the rear seat leg 11 being able to be swiveled around said joint element so as to create a variable spacing 19 between the first fastening element 13 and the second fastening element 15. Alternatively the first joint element 17 may be provided between the seat frame 7 and the front seat leg 9. This is not shown in the figures.

Thanks to the first joint element 17, which provides an axis of rotation, the folding passenger seat 1 can be transformed from a usable state 23, as shown in FIG. 6 for example, to a stored state 21, as shown in FIGS. 5 and 8 for example. In this case, in the stored state 21, the holding device 61 for the rear seat leg 11 is released from the seat rail 41 and connected to the front holding device 53 to form a unit. In the stored state 21 an unused passenger seat 1 can be stowed in a smaller space than a conventional seat. The extra space gained by transforming the folding seat 1 into the stored state 21 by using the holding device 53 can be used to increase the spacing between the seats in use in the passenger cabin. A different seating arrangement layout can thus be selected according to demand and occupancy for each individual flight or each individual journey. This would not be possible with conventional seats.

FIGS. 4 and 5 show a first folding passenger seat 1a and a second folding passenger seat 1b positioned one behind the other. The second folding passenger seat 1b is positioned behind the first folding passenger seat 1a in the direction of travel 49 of the means of passenger transport or in the seating direction. The folding passenger seats 1a, 1b in FIG. 4 are shown in an unfolded state in this case. The seats can be used by passengers in this unfolded state. However, the seats shown in FIG. 4 are pushed together as closely as possible, as is the case when storing conventional seats. In this case the spacing 19 between the first fastening element 13 and the second fastening element 15 is approximately 18" or about 19". The minimum possible seat spacing 25 from an adjacent front or rear seat is approximately 21" in this case. The seat spacing 25 may for example be the spacing between the second fastening element 15 for the first folding passenger seat 1a and the second fastening element 15 for the second folding passenger seat 1b.

In FIG. 5 the folding passenger seats 1a, 1b are shown in a stored state 21. In this case the additional holding device 61 and thus the rear seat leg 11 of the folding passenger seats 1a, 1b are in each case released from the seat rails 41 and swiveled as closely as possible to the front seat leg 9 via the first joint element 17. As a result a spacing 19 of between about 0" and about 5" can be achieved between the first fastening element 13 and the second fastening element 15 of the respective folding passenger seats 1a, 1b. A seat spacing 25 of between about 10" and about 11" is possible overall in the stored state 21 of the embodiment shown in FIG. 5. When transforming the folding passenger seat 1 to the stored state 21, the first fastening element 13 may act as a joint or point of rotation in the illustrated embodiments.

In addition to the variable spacing 19 between the first fastening element 13 and the second fastening element 15, additional components of the folding passenger seat 1 can also be designed to fold or collapse. As shown in FIG. 4 by means of arrows, the backrest 27 of the folding passenger seat 1 can be connected to the seat frame 7 such that it can rotate or swivel by means of a second joint element 29. In this process, the backrest 27 can be folded backwards with respect to the seating direction 49 in the stored state 21 such that said backrest is positioned in the region of a mid-perpendicular line between the fastening elements 13, 15 of the folding passenger seat 1 which have been pushed together.

In addition, a seat cushion 31 of the folding passenger seat 1 can be connected to the seat frame 7 or to a seat shell provided on the seat frame by means of a third joint element 33. In the stored state 21 the seat cushion 31 can be swiveled via the third joint element 33, as shown in FIG. 5, such that it is also positioned in the region of a mid-perpendicular line between the first fastening element 13 and the second fastening element 15 of the respective folding passenger seat 1. Furthermore, as shown in FIG. 5, an armrest 35 can be connected to the backrest 27 or alternatively to the seat frame 7 by means of a fourth joint element 37. In the stored state 21 the armrest 35 can be swiveled via the fourth joint element 37 such that said armrest is also positioned in the region of a mid-perpendicular line between the first fastening element 13 and the second fastening element 15.

FIGS. 6 to 8 show cabins 23 of a means of passenger transport 5 with different seating arrangements. In this case the passenger seats are combined to form a passenger seating system 3. The passenger seats are also positioned on the seat rails 41 in this case. This is shown in FIG. 7 by way of example. FIG. 6 shows a seating arrangement in the cabin of a means of passenger transport 5 in which all seats are used or occupied. In this case the seats may be designed as conventional seats 39 or also as folding passenger seats 1. There are 93 seats available overall. The seat spacing 25 between adjacent seats is about 32" in this configuration.

In the embodiment shown in FIG. 7, some of the seats, and specifically 26% of the seats, are unused, which means that only 69 seats are required for passengers. The unused rows of seats are pushed together in the rear region of the cabin 43 as shown in FIG. 4. As a result, the remaining seats or rows of seats can be arranged with a larger spacing compared with the configuration shown in FIG. 6. In one example, a seat spacing 25 of about 36" may be set for the used seats. The stowing method illustrated in FIG. 7 can be implemented with conventional seats 39 or with folding passenger seats 1 with or without holding devices 53.

However, the seating configuration illustrated in FIG. 8 is only possible by using holding devices 53 and folding passenger seats 1. FIG. 8 shows a cabin 43 of the means of passenger transport 5 in which, once again, only some of the seats are used. In this case the unused folding passenger seats 1 in the rear region of the cabin 43 are transformed to the stored state 21 as shown in the embodiment in FIG. 5. By rotating the rear seat leg 11 around the first joint element 17 and additionally releasing the rear seat leg 11 from the seat rails 41, the space required by the folding passenger seat 1 in the stored state 21 can be considerably reduced so that additional passenger seats can be provided compared with the embodiments in FIGS. 6 and 7 with a seat spacing 25 of about 36" or about 37". Seventy-eight seats with a seat spacing 25 of about 36" or about 37" can be provided overall in the embodiment shown in FIG. 8.

In this case, FIG. 8 shows that the folding passenger seats 1 can be combined with conventional seats 39 in the passenger seating system 3. For example, the folding passenger seats 1 can be arranged in a rear region of the cabin 43 and the conventional seats 39 can be arranged in a front region of the cabin.

FIG. 9 shows the configuration of the means of passenger transport 5 as an aircraft 47. The folding passenger seats 1 can be combined in this case to form rows of seats and arranged as a passenger seating system 3 on seat rails 41 in the cabin 43.

Figure 10:
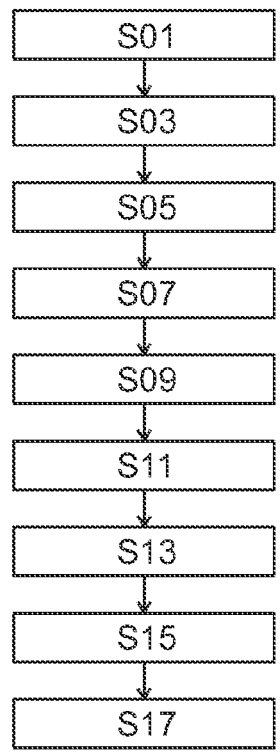
FIG. 10 shows a method for transforming a folding passenger seat in a passenger seating system from a usable state to a stored state.

FIG. 10 shows a method for transforming a folding passenger seat 1 of the passenger seating system 3 from a usable state 23 to a stored state 21. In S01 a rail cover 51 is released from the additional holding device 61. In S03 the additional holding device 63 which is connected to the rear seat leg 11 of the folding passenger seat 1 is released from the seat rail 41. In S05 the folding passenger seat 1 or the seat frame 7 is raised and the folding passenger seat 1 is rotated or swiveled around the first fastening element 13. In S07 the rear seat leg 11 is also swiveled around the first joint element 13. In addition, in S09, the sliding element 58 of the additional holding device 61 is positioned and fixed in a rail element 59 of the holding device 53. In S11 the folding passenger seat 1 or the backrest 27 is rotated around the second joint element 29 such that the backrest 27 is arranged in a substantially vertical position. In S13 the armrest 35 is rotated around a fourth joint element 37 such that the armrest 35 is also arranged in a substantially vertical position. In S15 the seat cushion 31 is rotated around the third joint element 33 such that said seat cushion is also positioned in a substantially vertical position. Finally, in S17, the rail cover 51 is raised and fixed to the rear seat leg 11 for example.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A holding device for fastening passenger seats in a means of passenger transport, said holding device comprising:
   a seat leg fixing element that receives a front seat leg of a passenger seat;
   a sliding element inserted into a seat rail on the means of passenger transport, the sliding element being provided on the opposite side of the holding device to the seat leg fixing element;
   a rail element provided on the same side as the seat leg fixing element,
   wherein the rail element receives and fixes a sliding element of an additional holding device that receives a rear seat leg of the passenger seat such that in the stored state, the additional holding device with the rear seat leg is in a higher position than in the used state to permit a more upright position and reduce the space taken up by the passenger seat in the stored state.

2. The holding device according to claim 1, wherein the rail element is substantially the same as the seat rail of the means of passenger transport.

3. The holding device according to claim 1, wherein the rail element has an undercut profile.

4. A passenger seating system with a flexible seating arrangement for a means of passenger transport, said passenger seating system comprising:
   a holding device including a seat leg fixing element, a sliding element on an opposite side of the holding device to the seat leg fixing element, and a rail element provided on the same side as the seat leg fixing element;
   a seat rail which is arranged on the means of passenger transport;
   a folding passenger seat with a front seat leg and a rear seat leg;
   a first fastening element on the front seat leg and a second fastening element on the rear seat leg;
   one of the first and second fastening elements being fixed in the seat leg fixing element of the holding device;

the sliding element of the holding device being engaged with the seat rail;

the other of the first and second fastening elements being fixed in a seat leg fixing element of an additional holding device;

the rail element of the holding device that receives and fixes a sliding element of the additional holding device that receives the rear seat leg of the passenger seat such that in the stored state, the additional holding device with the rear seat leg is in a higher position than in the used state to permit a more upright position and reducing the space taken up by the passenger seat in the stored state.

5. The passenger seating system according to claim 4, wherein the folding passenger seat includes a seat frame.

6. The passenger seating system according to claim 4, wherein the folding passenger seat is designed to adopt a usable state in which the holding device and the additional holding device are positioned in the seat rail.

7. The passenger seating system according to claim 6, wherein the folding passenger seat adopts a stored state in which the sliding element of the additional holding device is positioned in the rail element of the holding device.

8. The passenger seating system according to claim 4, wherein the holding device and the additional holding device are the same.

9. The passenger seating system according to claim 4, wherein the first fastening element is fixed in the seat leg fixing element of the holding device and the second fastening element is fixed in the seat leg fixing element of the additional holding device.

10. An aircraft, comprising:
a passenger cabin with a cabin floor;
a seat rail coupled to the cabin floor;
a passenger seating system coupled to the seat rail, the passenger seating system including:
  a folding passenger seat with a front seat leg and a rear seat leg;
  a holding device having a seat leg fixing element, a sliding element on an opposite side of the holding device to the seat leg fixing element, the sliding element of the holding device being engaged with the seat rail, and a rail element provided on the same side as the seat leg fixing element;
an additional holding device; and
a first fastening element on the front seat leg and a second fastening element on the rear seat leg, with one of the first and second fastening elements being fixed in the seat leg fixing element of the holding device and the other of the first and second fastening elements being fixed in a seat leg fixing element of the additional holding device, wherein the rail element of the holding device receives and fixes a sliding element of the additional holding device that receives the rear seat leg of the passenger seat such that in the stored state, the additional holding device with the rear seat leg is in a higher position than in the used state that permits a more upright position and reducing the space taken up by the passenger seat in the stored state.

11. A method for transforming a folding passenger seat of a passenger seating system from a usable state to a stored state, the method comprising the steps of:
releasing an additional holding device which is connected to a rear seat leg of the folding passenger seat from a seat rail;
swivelling the rear seat leg around a first joint element;
positioning and fixing a sliding element of the additional holding device in a rail element of a holding device such that in the stored state, the additional holding device with the rear seat leg is in a higher position than in the used state that permits a more upright position and reducing the space taken up by the passenger seat in the stored state.

12. The passenger seating system according to claim 5, further comprising a first joint element arranged between at least one of the front seat leg and the seat frame and between the rear seat leg and the seat frame such that the spacing between the first fastening element and the second fastening element is variable.

13. The passenger seating system according to claim 7, wherein the folding passenger seat adopts a seat spacing of a maximum of 11 inches from at least one of an adjacent front seat and an adjacent rear seat in the stored state.

14. The aircraft according to claim 10, wherein the rail element is the same as the seat rail.

15. The aircraft according to claim 10, wherein the rail element has an undercut profile.

* * * * *